United States Patent Office 3,510,473
Patented May 5, 1970

3,510,473
PROCESS OF PRODUCING NUCLEOTIDES AND OLIGONUCLEOTIDES BY A THERMAL REACTION
Josef Morávek and Jan Škoda, Prague, Czechoslovakia, assignors to Ceskoslovenska Akademie ved, Prague, Czechoslovakia
No Drawing. Filed Dec. 1, 1966, Ser. No. 598,221
Claims priority, application Czechoslovakia, Dec. 2, 1965, 7,240/65
Int. Cl. C07c 95/04
U.S. Cl. 260—211.5          10 Claims

ABSTRACT OF THE DISCLOSURE

Production of nucleotides and oligonucleotides by the reaction of necleosides, nucleotides of the pyrimidine type and tubercidin with alkali metal phosphates, nucleotides and anomalous nucleotides at about 155 to 160° C. wherein the reactant ratio is about 1:1 to 1:10 respectively.

---

The present invention relates to a process of producing nucleotides and oligonucleotides by a thermal reaction.

The present invention solves the problem of producing nucleotidic compounds by a preparative utilization of a reaction which consists in a thermal phosphorylation of nucleosides. Under a certain molar ratio of reactants and under certain conditions it is possible to prepare nucleoside monophosphates and oligonucleotides derived from both the naturally occurring and anomalous nucleosides. The yields of the thermal reaction are also economically very advantageous with some nucleotides.

The nucleotidic compounds have been hitherto synthesized by elaborate, laborious and expensive chemical procedures requiring a suitably protected starting material. Moreover, the nucleotidic compounds could not be prepared in lesser amounts than in centigram quantities, by the methods hitherto used. On the other hand, the process according to the present invention can be realized in the range of several micrograms. This fact is of special importance in reactions of nucleosides labeled with radioisotopes ($^{14}$C, $^{3}$H, $^{35}$S) and non-radioactive or $^{32}$P-phosphates. By this route, we obtained labeled compounds containing soft β-emitter in the nucleoside moiety or a hard β-emitter in the phosphate residue of the molecule. The importance of such double-labeled nucleotides for biological research is enormous.

The present process of producing nucleotides and oligonucleotides from the naturally occurring nucleosides comprises heating to 155–160° C. a mixture of a nucleoside and a phosphate of alkali metals or a nucleoside 2'(3')-phosphate in the ratio 1:1 to 10, preferably in the ratio 1:5, separating the reaction mixture by chromatography, detecting the individual nucleotides or oligonucleotides, and isolating the product from the eluates in a pure state. Furthermore, 6 - azauridine, 6 - azacytidine, 5 - hydroxyuridine, uracil oxyloside, or, tubercidine may be used as anomalous nucleosides. Finally, in the preparation of mixed oligonucleotides, a mixture of two or more nucleosides or nucleotides may be subjected to the reaction.

Isolation of nucleotides or oligonucleotides from the reaction mixture may be advantageously performed by a simple and effective procedure, namely, by preparative paper chromatography, elution of the products from the paper and freeze-drying (lyophilization) of the eluate. By this route, the unreacted nucleosides can be separated, isolated without any loss and used again in the subsequent thermal reaction. When the thermal phosphorylation of nucleosides is performed on a larger scale, the resulting nucleotides can be separated and isolated in columns of ion exchange resins or molecular sieves.

To show the character of the linkage between the nucleosides and phosphoric acid, the nucleotides and oligonucleotides resulting by the thermal reaction were subjected to an enzymic hydrolysis by means of the Russel's viper venom. By this procedure it was established that the thermal reaction led to nucleotides in which the residue of phosphoric acid was attached to the 5'-hydroxylic or 3'-hydroxylic function of the nucleoside, or to oligonucleotides containing the 3'→5' phosphodiester linkage. The process of the present invention thus furnishes nucleotidic compounds widely used in the biochemical and biological research.

By-product containing another type of internucleotidic linkage (e.g., 2'→5') can be separated by a one-stage ion exchange resin chromatography.

According to the present invention, nucleotides can be prepared from the naturally occurring as well as from anomalous nucleosides with a modified heterocyclic moiety or a modified sugar moiety or modified both in the heterocyclic and the sugar moiety. Many of the starting anomalous nucleosides exhibit outstanding biological properties, e.g., an anticancer action or an abortive action, or are used as antibiotics or growth promotors. These properties of anomalous starting nucleosides contribute to a considerable importance of the nucleotidic compounds obtained by the process of invention.

The enclosed table shows a survey of some nucleosides which were used for the preparation of nucleotides and oligonucleotides according to the process of the invention. By a suitable choice of the temperature range, molar ratios of reactants and water-content of the reaction mixture, it was possible to find optimum conditions for the formation of the desired phosphoric acid acid derivatives.

The thermal phosphorylation according to the present invention may be performed with the use of two or more nucleosides with the formation of oligonucleotides containing heterogeneous bases.

TABLE—SURVEY OF NUCLEOSIDES SUBJECTED TO THE PHOSPHORYLATION ACCORDING TO THE PRESENT INVENTION

| | | |
|---|---|---|
| Naturally occurring nucleosides | Ribosides | Cytidine. Uridine. Pseudiuridine. Orotidine. |
| | Deoxyribosides | Deoxycytidine. Deoxyuridine. Thymidine. |
| Anomalous nucleosides | With a modified heterocyclic moiety. | 6-Azauridine. 6-Azacytidine. |
| | With a substituted heterocyclic moiety. | 5-Hydroxyuridine. |
| | With a modified sugar moiety. | Uracil Xyloside. |
| | Antibiotics | Tubercidine. |

EXAMPLE 1

Uridine (3.6 g.) and primary sodium phosphate dihydrate (NaH$_2$PO$_4$·2H$_2$O; 11.7 g.) are mechanically mixed in an open flask which is inserted to the neck into a bath preheated to 160° C. After heating for one hour, the reaction mixture is cooled, dissolved in water, and the solution is filtered to remove a small amount of insoluble solid. The filtrate is chromatographed on a column of a weakly acid anion exchange resin in the formate cycle with the use of a gradient elution in a standard system formic acid: formic acid+formate. The fractions are taken automatically and their content is evaluated by the determination of ultraviolet absorption at 260 nm. The corresponding fractions are pooled according to the elution graph and concentrated. The product is precipitated under cooling with ice in the form barium salts. The salts are collected, washed with iced ethanol, a mixture of ethanol and ether, and finally with ether, and dried over phosphorus pentoxide.

As shown by paper chromatography of individual fractions, the following compounds were obtained: uridylyl-(2'→5')-uridine and uridylyl-(3'→5')-uridine (7%), uridine 3'-phosphate (15%), uridine 5'-phosphate (15%), and 35% of the recovered uridine in a pure fraction. The overall yield of all phosphorylated compounds was 62%.

EXAMPLE 2

6-azauridine-4,5-$^{14}$C (500 micrograms) and $$NaH_2PO_4 \cdot 2H_2\text{-}^{32}P$$

(1620 micrograms) are dissolved in distilled water (2 ml.), and freeze-dried in a small test-tube. The test-tube is inserted to two-thirds into a bath preheated to 160° C. and the content is heated at this temperature for 30 minutes. After cooling down, the reaction mixture is dissolved in water (0.5 ml.) and the solution is applied to one sheet of a chromatographical paper. The chromatography was performed by the descending technique in the solvent mixture isobutyric acid-aqueous ammonia-water (66:32.5:1.5). The solvent was removed from the paper at room temperature in a current of air. The products were detected automatically on a strip of the paper by activity measurement. The corresponding bands of the chromatogram were then continuously eluted with water and the eluates rechromatographed in the solvent mixture 2-propanol-aqueous ammonia-water (7:1:2). The products thus purified were eluted with water and freeze-dried.

EXAMPLE 3

6-azauridine-4,5-$^{14}$C (3 mg.) and 6-azacytidine (3 mg.) was mixed with primary sodium phosphate dihydrate ($NaH_2PO_4 \cdot 2H_2O$) (20 mg.) and the mixture heated in a test-tube for 15 minutes at 160° C., the test-tube being immersed to two thirds. When the reaction was accomplished, the mixture was applied to a chromatographic paper and developed in the solvent mixture 2-propanol-aqueous ammonia-water (7:1:2).

When the front of the solvent reached the end of the paper the chromatogram was dried and redeveloped in the same solvent system. This procedure was repeated three times. Nucleosides and nucleotides situated in the lower part of the chromatogram were recovered by elution. The oligonucleotides situated in the upper part of the chromatogram were eluted and the eluates freeze-dried (18%). The oligonucleotidic fraction ion was degraded with the Russel's viper venom in 1 M hydroxymethyl-ammoniummethane buffer (pH 8) in the presence of $Mg^{2+}$ ions. As shown by chromatography of the enzymic digest, 6-azauridine and 6-azacytidine were liberated from the oligonucleotides by the action of the venom enzymes.

EXAMPLE 4

The reaction of 5-hydroxyuridine (0.3 g.) and $NaH_2PO_2 \cdot 2H_2O$ (1 g.) was performed in analogy to Example 1, but the nucleotides were isolated by chromatography on 6 sheets of the chromatographic paper. Yield of the isolated nucleotidic fraction was 82%.

EXAMPLE 5

A solution of uridine-2-$^{14}$C (2.44 mg.) in 0.1 ml. of water was thoroughly mixed with 0.1 ml. of an aqueous solution of 3.24 mg. of non-radioactive uridylic acid. The water was removed by freeze-drying and the resulting mixture was heated to 160° C. for 5 minutes in an evacuated vessel. Isolation of products was performed in analogy to Example 3. Yield, 8% of uridylyl-(3'→5')-uridine, 8% of uridylyl-(2'→5')-uridine and 10% of $^{14}$C-uridine 2'(3')-phosphate. The unreacted starting $^{14}$C-uridine was successfully recovered.

EXAMPLE 6

The reaction of 6-azacytidine (360 mg.) and $NaH_2PO_4 \cdot 2H_2O$ (1.17 g.) was performed in analogy to Example 1 and the isolation of products was carried out in analogy to Example 4. Yield, 65% of nucleotides.

EXAMPLE 7

The reaction of uracil xyloside (350 mg.) and $NaH_2PO_4 \cdot 2H_2O$ (1.2 g.) was performed in analogy to Example 1 and the isolation was carried out in analogy to Example 4. Yield, 26% of nucleotides.

EXAMPLE 8

The reaction of tubercidine (3 mg.) and $$NaH_2PO_4 \cdot 2H_2O$$

was performed in analogy to Example 1 and the resulting nucleotides (yield, 25%) were isolated by paper chromatography on one sheet of a chromatographic paper.

What we claim is:

1. The process of making mononucleotides or oligonucleotides by subjecting (A) a naturally occurring or anomalous nucleoside of the pyrimidine type or tubercidin to a phosphorylation reaction with (B) an inorganic alkali metal monophosphate or a nucleoside monophosphate, the two compounds at (A) and (B) being present in a ratio between 1:1 and 1:10; and the reaction being effected at a temperature between about 155 and 160° C.; and recovering the desired product from the reaction mixture.

2. The process of claim 1 wherein the compounds at (A) and (B) are present in a ratio of about 1:5.

3. The process of claim 1 wherein the nucleoside monophosphate is uridylic acid.

4. The process of claim 1 wherein the compounds at (A) are tagged with a radioactive isotope constituted by $^{14}$C or $^3$H.

5. The process of claim 1 wherein the compounds at (B) are tagged with radioactive $^{32}$P.

6. The process of claim 1 wherein the compounds at (A) are tagged with radioactive $^{14}$C or $^3$H and wherein the compounds at (B) are tagged with radioactive $^{32}$P.

7. The process of claim 1 wherein the reaction mixture is separated by chromatographic methods.

8. The method of claim 1, wherein a mixture of two or more nucleosides is subjected to the heating so as to produce mixed oligonucleotides.

9. The method of claim 1, wherein the alkali metal phosphate is sodium phosphate dihydrate.

10. The method claimed in claim 1 wherein said nucleoside is at least one member selected from the group consisting of cytidine, uridine, pseudo-uridine, orotidine, deoxycytidine, deoxyuridine, thymidine, 6-azauridine, 6-azacytidine, 5-hydroxy uridine, uracil xyloside.

References Cited

UNITED STATES PATENTS

| | | | |
|---|---|---|---|
| 2,700,038 | 1/1955 | Lipton et al. | 260—211.5 |
| 2,719,148 | 9/1955 | Reiff et al. | 260—211.5 |
| 3,299,043 | 1/1967 | Schramm et al. | 260—211.5 |
| 3,309,358 | 3/1967 | Hanze | 260—211.5 |

ELBERT L. ROBERTS, Primary Examiner

J. R. BROWN, Assistant Examiner